US00RE41099E

(19) United States
(12) Reissued Patent
Terekhov

(10) Patent Number: US RE41,099 E
(45) Date of Reissued Patent: Feb. 9, 2010

(54) COBALT RECOVERY PROCESS

(75) Inventor: Dmitri S Terekhov, Weston (CA)

(73) Assignee: Chemical Vapour Metal Refinings Inc., Ontario (CA)

(21) Appl. No.: 12/320,290

(22) Filed: Jan. 22, 2009

Related U.S. Patent Documents

Reissue of:
(64) Patent No.: 6,428,601
Issued: Aug. 6, 2002
Appl. No.: 09/766,666
Filed: Jan. 23, 2001

(30) Foreign Application Priority Data

Jan. 25, 2000 (CA) ..... 2296964

(51) Int. Cl.
*C22B 3/44* (2006.01)
*C22B 23/00* (2006.01)

(52) U.S. Cl. ..... 75/362; 75/626
(58) Field of Classification Search ..... 75/362, 75/626, 627
See application file for complete search history.

(56) References Cited

U.S. PATENT DOCUMENTS 3,252,791 A * 5/1966 Frysinger ..... 75/362
3,672,873 A * 6/1972 Huggins et al. ..... 75/430
3,839,077 A * 10/1974 Robinson ..... 427/213
3,966,886 A * 6/1976 Bakker ..... 423/417
4,685,030 A * 8/1987 Reyes et al. ..... 361/783

FOREIGN PATENT DOCUMENTS

CA 1148365 * 6/1983

OTHER PUBLICATIONS

Wender, "Organic syntheses via metal carbonyls", Interscience, 1968, pp. 200–203, 208–209, New York.*

Seel, "On a New Preparation Method for the Nitrosyl Carbonyls of Cobalt and Iron", On Metal Carbonyls 51, 1952, Munich.*

Anderson, "On a Volatile Iron–Nitroso–Carbonyl, Fe(CO)2(NO)2", Journal for Inorganic and General Chemistry, 1932, vo. 208, Heidelberg, Germany.*

Richter–Addo, George B. et al., "Recent Organometallic Nitrosyl Chemistry", Chemical Reviews, vol. 88, No. 7, 1988, pp. 991–1010.*

* cited by examiner

*Primary Examiner*—George Wyszomierski
(74) *Attorney, Agent, or Firm*—Jeffrey S. Melcher; Manelli Denison & Selter PLLC

(57) ABSTRACT

A process for producing purified cobalt from a mixture comprising metallic species of cobalt and metallic species of at least one of the group consisting of nickel and iron, comprising producing a metal carbonyl mixture of cobalt carbonyl and at least one of nickel carbonyl and iron carbonyl from the metallic species mixture; separating the nickel carbonyl and/or iron carbonyl from the cobalt carbonyl; treating the cobalt carbonyl with an effective amount of a complexing gaseous mixture of nitric oxide/carbon monoxide to produce cobalt nitrosyl tricarbonyl; and decomposing the purified cobalt nitrosyl carbonyl to provide purified cobalt and regenerated complexing gaseous mixture for recycle. The process provides cobalt of improved quality in an optionally, Continuous and closed-loop manner. Preferred processes include either aqueous and/or gaseous process steps.

8 Claims, 4 Drawing Sheets

COBALT RECOVERY PROCESS

Matter enclosed in heavy brackets [ ] appears in the original patent but forms no part of this reissue specification; matter printed in italics indicates the additions made by reissue.

This application claims priority to Canadian Patent Application No. 2,296,964, filed on Jan. 25, 2000 the complete disclosure of which is incorporated herein by reference.

FIELD OF THE INVENTION

This invention relates to a method and apparatus for the recovery of cobalt from impure cobalt, particularly from cobalt containing materials, ores, scrap, slag, concentrates, metallurgical intermediates and by-products and, more particularly, nickel-and iron-containing materials.

BACKGROUND OF THE INVENTION

It is well-known that metals such as, for example, nickel and iron can be recovered from reduced metal-containing mixtures, using carbonylation processes. Volatile nickel and iron carbonyls are formed at elevated temperatures and pressures, separated, isolated and thermally decomposed to yield pure metal pellets and carbon monoxide gas. The purity of the nickel metal produced by this process is extremely high because of the selectivity of the carbonylation reaction and the fact that the other metals, often present with nickel, are either easily separated, or do not form gaseous compounds. However, in contrast, iron carbonyl cannot be completely separated from nickel carbonyl because these compounds form an inseparable isotropic mixture.

It has been reported that cobalt, which is often present with nickel and iron in metal-containing mixtures, such as ores and tailings, together forms a cobalt carbonyl under similar conditions particularly, when hydrogen is used, together with carbon monoxide for the formation of carbonyls. Cobalt carbonyl, having much lower vapour pressure than nickel and iron carbonyls, usually remains in the carbonyl reactor together with solid leftovers of the carbonylation reaction, or is partially carried, together with volatile carbonyls, and left as a solid residue after nickel and iron carbonyls' fractional separation. The further isolation of cobalt usually involves desolution of cobalt in acid, followed by electrowinning.

Similarly, carbonylation of metals-containing mixture as in alkaline solution leads to the formation of gaseous nickel carbonyl as well as iron and cobalt carbonyl compounds that remain the solution. A further refining of cobalt involves an acidification of the solution, followed by cobalt organic solvent extraction. The extracted cobalt is then purified by electrowinning.

There have been several attempts to achieve cobalt extraction using volatile cobalt carbonyl precursors such as cobalt hydrocarbonyl. For example, when a slurry of cobalt, nickel and copper metals were treated with a carbon monoxide-hydrogen gas mixture at 68 bar pressure, mixtures of nickel carbonyl and cobalt carbonyl anions were produced. Volatile nickel carbonyl was degassed from the solution and the residue was filtered out. The basic solution of cobalt carbonyl salt was acidified with strong acid and volatile cobalt hydrocarbonyl boiled and removed from solution. Subsequent decomposition of cobalt hydrocarbonyl resulted in a pure cobalt metal containing 30 ppm of Ni, 0.4 ppm of Fe and 0.1 ppm of copper. This procedure involves several handling processes, including filtration of the solution, dilution and acidification of the resulting solution.

Other separations of cobalt carbonyl from nickel carbonyl involved addition of ammonia to precipitate $\{Co(NH_3)_6 \Pi Co(CO)_4]_2$, or cobalt removal by passage through ethanolic KOH.

It is known that iron nitrosyl carbonyl $Fe(NO)_2(CO)_2$ has been prepared in the gaseous state by the reaction of NO with $FE(CO)_5$ at 95° C., and in aqueous alkaline solution. However, I have discovered that $CoNO(CO)_3$ can be beneficiously and efficaciously distilled from Fe-containing carbonyl species to provide Fe-free $CoNO(CO)_3$ gas for subsequent decomposition to pure cobalt metal (99.8%).

SUMMARY OF THE INVENTION

It is an object of the present invention to provide apparatus and process for producing purified cobalt from mixtures comprising impure metallic cobalt or compounds thereof, in admixture with metallic nickel and/or iron or compounds thereof.

In its broadest aspect, the invention provides a process for producing purified cobalt from a mixture comprising metallic species of cobalt and metallic species of at least one of the group consisting of nickel and iron; said process comprising producing a metal carbonyl mixture of cobalt carbonyl and at least one of said nickel carbonyl and iron carbonyl from said metallic species mixture;

separating said nickel carbonyl and/or iron carbonyl from said cobalt carbonyl to provide a nickel carbonyl- and iron carbonyl-free resultant mixture;

treating said resultant mixture with an effective amount of a complexing gaseous mixture of nitric oxide/carbon monoxide to produce cobalt nitrosyl tricarbonyl;

decomposing said cobalt nitrosyl carbonyl to provide said purified cobalt and regenerated complexing gaseous mixture; and removing said regenerated complexing gaseous mixture.

In one preferred aspect the invention provides a process for producing purified cobalt from a mixture comprising metallic species of cobalt, and at least one of the group consisting of nickel and iron; said process comprising (i) reacting said metallic species with carbon monoxide to form a carbonyl mixture comprising cobalt carbonyl and nickel carbonyl and/or iron carbonyl, provided that when said metallic species comprises non-elemental metal species, said mixture is, optionally, first treated with a reducing agent to reduce said non-elemental metallic species to said elemental metal;

(ii) removing said nickel carbonyl and said iron carbonyl by distillation from said carbonyl mixture to provide a nickel- and iron-depleted impure cobalt carbonyl mixture;

(iii) treating said impure cobalt carbonyl mixture with an effective amount of a complexing gaseous mixture of nitric oxide/carbon monoxide to produce cobalt nitrosyl carbonyl;

(iv) decomposing said cobalt nitrosyl carbonyl to provide said purified cobalt and regenerated complexing gaseous mixture; and (v) removing said regenerated complexing gaseous mixture.

By the term "metallic species" in this specification is meant to include the metal in the form of the elemental metal per se, sulfides, oxides, salts thereof, and minerals, concentrates, metallurgical intermediates, by-products and the like containing said elemental metal, sulfide, oxide and salts; and mixtures thereof.

It will be readily understood by the skilled person in the art that the process as hereinabove defined does not require the optional reduction step when the mixture does not contain sufficient reducable non-elemental metal compounds as hereinabove defined. The optional reduction step may be carried out by reducing agents, such as for example, carbon monoxide, hydrogen or mixtures thereof. The aforesaid carbonylation step (i) may be carried out simultaneously as the optional carbon monoxide reduction to elemental metal step.

Surprisingly, I have discovered that to effectively separate cobalt from nickel-and/or iron containing admixtures according to one aspect of the present invention, that both nickel carbonyl and/or iron carbonyl must be removed first from the cobalt carbonyl containing admixture, in the complexing reaction vessel. Subsequent production and isolation of complexed cobalt carbonyl compounds, such as for example, cobalt nitrosyl tricarbonyl provides a desired pyrolsable precursor for purified metal cobalt production.

By the term "nickel carbonyl- and iron carbonyl-free" is meant. in this specification and claims that the amount of these metal carbonyls may be extremely low, but not necessarily absolute. The amount that can be tolerated in the practice of the invention is that which does not result in greater than 0.1% w/w of each of nickel and iron as metal in the resultant purified cobalt product. An important aspect of the present invention is that although iron nitrosyl carbonyl has been reported to exist, it either is not formed or does not vaporize in addition with the cobalt nitrosyl tricarbonyl and carried over to the vapour deposition reactor for co-deposition with the cobalt.

Most preferably, the nickel carbonyl and/or iron carbonyl gases of step (ii) are subsequently pyrolysed to provide regenerated carbon monoxide for recycle to step (i). Yet further, preferably, the regenerated complexing gaseous mixture of step (vi) is recycled to step (iii).

Thus, recycling of aforesaid gaseous carbon monoxide advantageously provides for a continuous, closed-loop, purified cobalt production process, preferably under the control of a computer algorithmic microprocessor means.

Accordingly, in a preferred aspect of the invention provides a process as hereinbefore defined further comprising continuously self-monitoring, under the control of computer algorithmic microprocessor means, by measuring, controlling and adjusting process parameters selected from the group consisting of temperature, pressure, gaseous input flow rates, gaseous output flow rates and power supply.

The nickel carbonyl $Ni(CO)_4$, and/or iron carbonyl $Fe(CO)_5$ may be readily removed by vaporization, distillation—vacuum or otherwise, from the carbonylation reactor to leave behind cobalt carbonyl, $(Co)_2(CO)_8$.

In a further aspect the invention provides apparatus for producing purified cobalt from a mixture comprising metallic species of cobalt and metallic species of at least one of the group consisting of nickel and iron, said apparatus comprising (i) means for producing a metal carbonyl mixture of cobalt carbonyl and at least one of said nickel carbonyl and iron carbonyl from said metallic species mixture;

(ii) vaporization means for separating said nickel carbonyl and said iron carbonyl from said cobalt carbonyl to provide a resultant nickel carbonyl-and iron carbonyl-free mixture;

(iii) means for treating said resultant mixture with an effective amount of a complexing gaseous mixture of nitric oxide/carbon monoxide to produce cobalt mitrosyl tricarbonyl;

(iv) means for decomposing said cobalt nitrosyl tricarbonyl to provide said purified cobalt and regenerated complexing gaseous mixture;

(v) means for recycling said regenerated complexing gaseous mixture to said means (iii) and (vi) continuously self-monitoring computer algorithmic microprocessor means for measuring, controlling and adjusting process parameters selected from the group consisting of temperature, pressure, gaseous input flow rates, gaseous output flow rates, metal carbonyl, carbon monoxide, nitric oxide and cobalt nitrosyl tricarbonyl concentrations in gaseous state and power supply.

In an alternative preferred aspect, the invention provides a process for producing purified cobalt from a mixture comprising metallic species of cobalt and metallic species of at least one of the group consisting of nickel and iron; said process comprising (i) treating said mixture in aqueous alkaline medium with hydrogen sulfide to effect reduction of metal species to soluble metallic species;

(ii) subsequently treating said medium with carbon monoxide to produce cobalt carbonyl in admixture with nickel carbonyl and/or iron carbonyl in aqueous slurry;

(iii) removing said nickel carbonyl, if any, by volatilization from said solution; to provide a nickel carbonyl-depleted slurry;

(iv) treating said cobalt carbonyl with an effective amount of a complexing gaseous mixture of nitric oxide/carbon monoxide mixture to produce cobalt nitrosyl tricarbonyl;

(v) isolating said complexed cobalt carbonyl by distillation to provide purified cobalt nitrosyl carbonyl;

(vi) decomposing said purified cobalt nitrosyl carbonyl to provide said purified cobalt and regenerated complexing gaseous mixture; and (vii) removing said regenerated complexing gaseous mixture.

BRIEF DESCRIPTION OF THE DRAWINGS

In order that the invention may be better understood, preferred embodiments will now be described by way of example only with reference to the accompanying drawings, wherein.

DETAILED DESCRIPTION OF PREFERRED EMBODIMENTS

Figure 1:
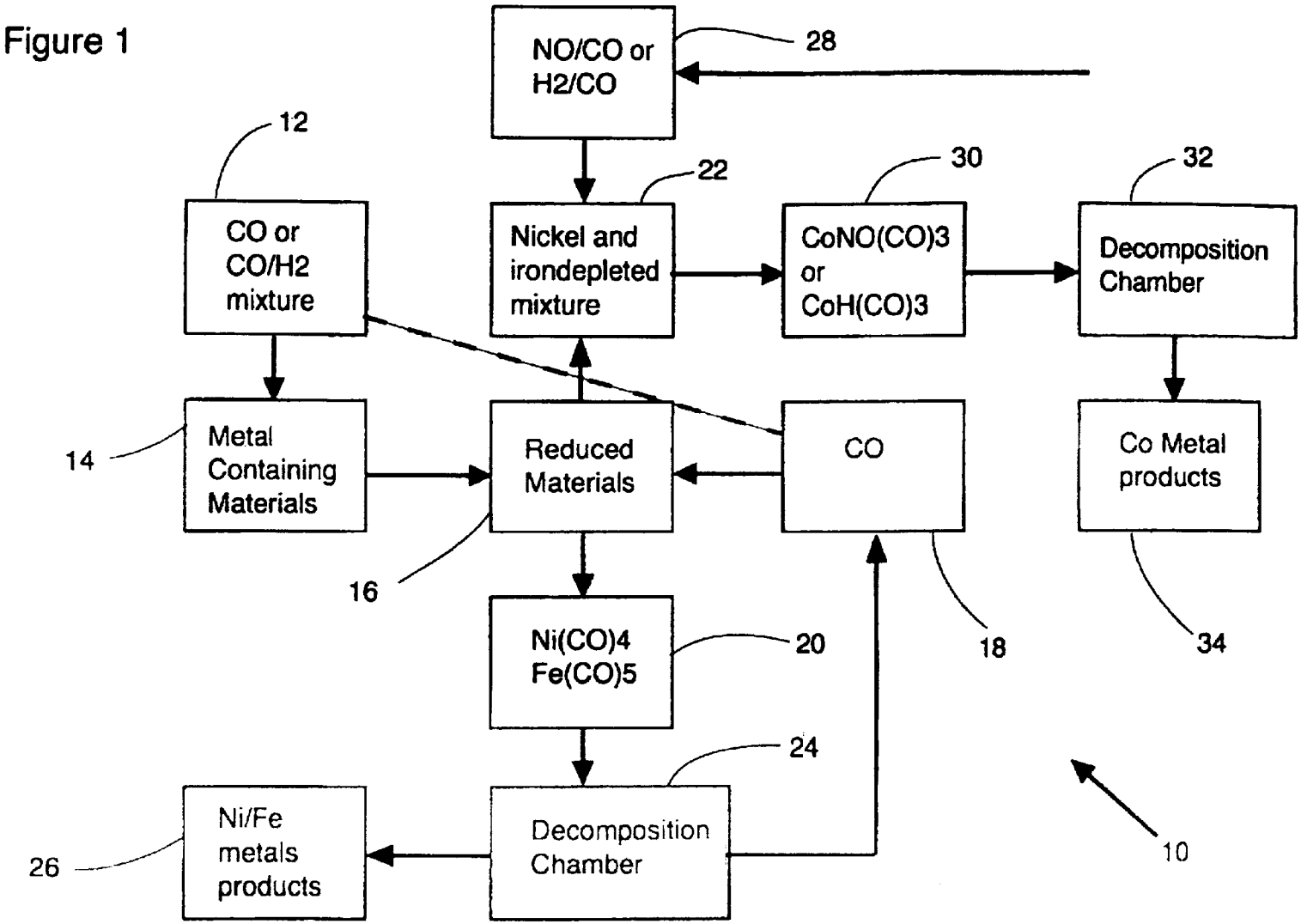
FIG. 1 is a block diagram of the apparatus and process steps of one embodiment according to the invention.

FIG. 1 shows generally as 10 a non-aqueous cobalt recovery process wherein a reducing agent 12 selected from carbon monoxide and a carbon monoxide/hydrogen mixture is reacted with a cobalt oxide, nickel sulfide and iron oxide mixture 14 to produce an elemental trimetallic admixture 16, which is reacted with further carbon monoxide 18 to effect carbonylation of each of the three metal within reactor 16. Vacuum distillation of the carbonyl compounds in reactor 16 provides nickel carbonyl $Ni(CO)_4$ and $Fe(CO)_5$ 20 removal and a residual nickel-iron-depleted mixture 22. Nickel and iron carbonyls 20 are subsequently pyrolysed in decomposition chamber 24 to provide metallic nickel/iron 26 and regenerated carbon monoxide recycled as source 18.

Mixture 22 containing solid polymeric, for example, dimeric cobalt carbonyl $Co_2(CO)_8$ is treated with a complexing gaseous admixture selected from the group consisting of nitric oxide carbon monoxide and hydrogen/carbon monoxide 28 to produce cobalt nitrosyl tricarbonyl or cobalt carbonyl hydride, respectively, 30.

The complexed cobalt carbonyls are transferred by distillation to decomposition chamber 32 and pyrolized therein to produce purified metallic cobalt 34. Regenerated nitric oxide/carbon monoxide or hydrogen/carbon monoxide admixtures are recycled to 28.

The aforesaid embodiment represents a closed loop gaseous recycle process adaptable to be operably continuous by the addition of impure polymetallic species feedstock and removal or purified metallic cobalt and nickel and iron by-products.

Figure 2:
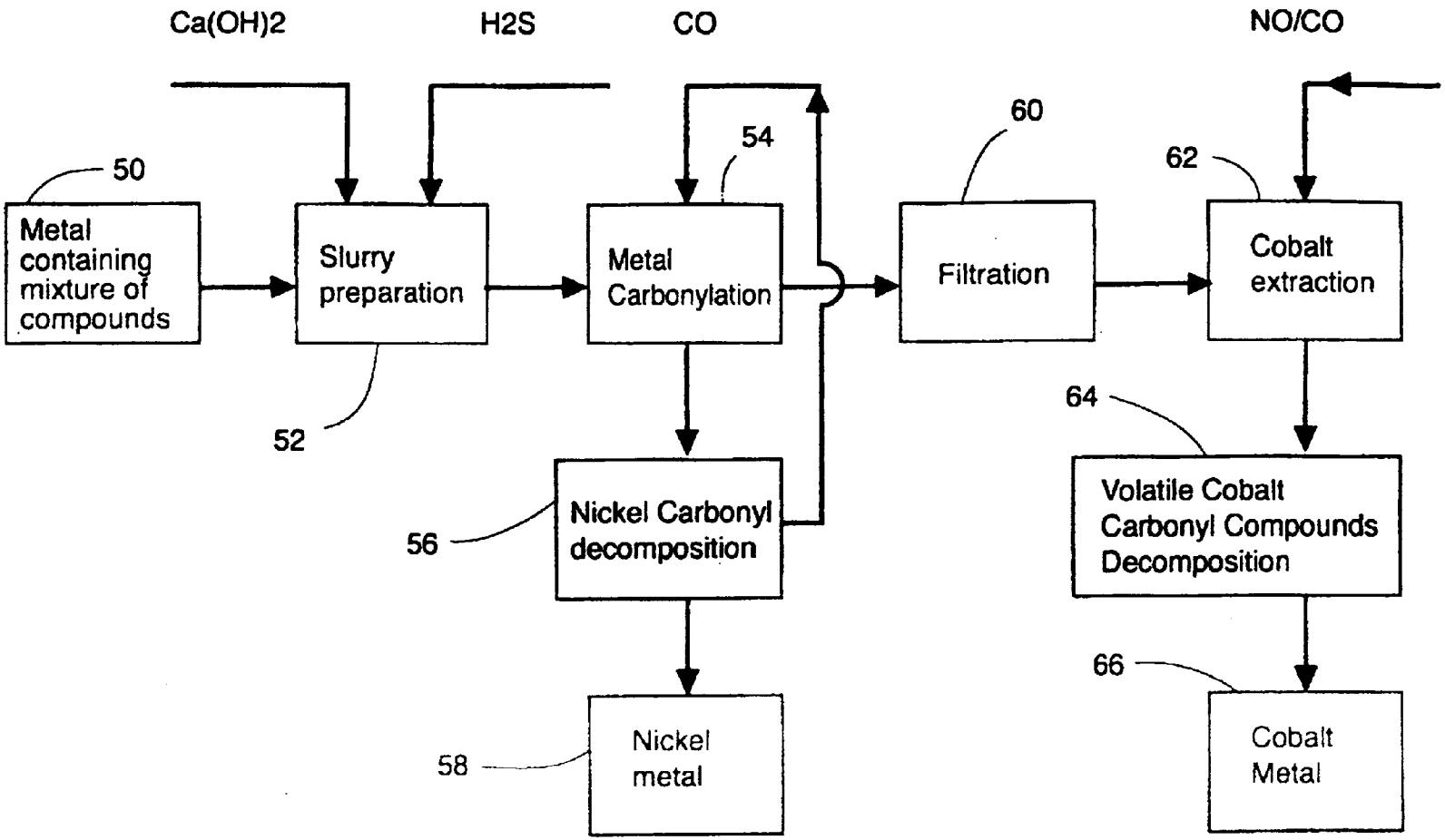
FIG. 2 is a block diagram of the apparatus and process steps of an alternative embodiment according to the invention.

FIG. 2 shows generally as 100 an aqueous cobalt recovery system wherein a cobalt oxide, nickel oxide and iron sulfide mixture 50 is slurried in aqueous alkaline solution 52 with calcium hydroxide and hydrogen sulfide.

Carbonylation of the trimetallic species is carried out with carbon monoxide 54. Nickel carbonyl is volatilized from the mixture 54 and subsequently pyrolized 56 to produce purified nickel 58 and regenerated carbon monoxide.

The nickel-depleted slurry is filtered 60 to provide a clear solution 62. The cobalt and iron carbonyl species remain in solution as anion species, $Co(CO)_4$ and $Fe(CO)_3^-$.

Cobalt carbonyl 62 is then treated with a complexing admixture of nitric oxide/carbon monoxide to produce cobalt nitrosyl tricarbonyl 64 which is isolated and subsequently pyrolysed to produce purified metallic cobalt 66 and regenerated complexing admixture for optional recycle.

Figure 3:
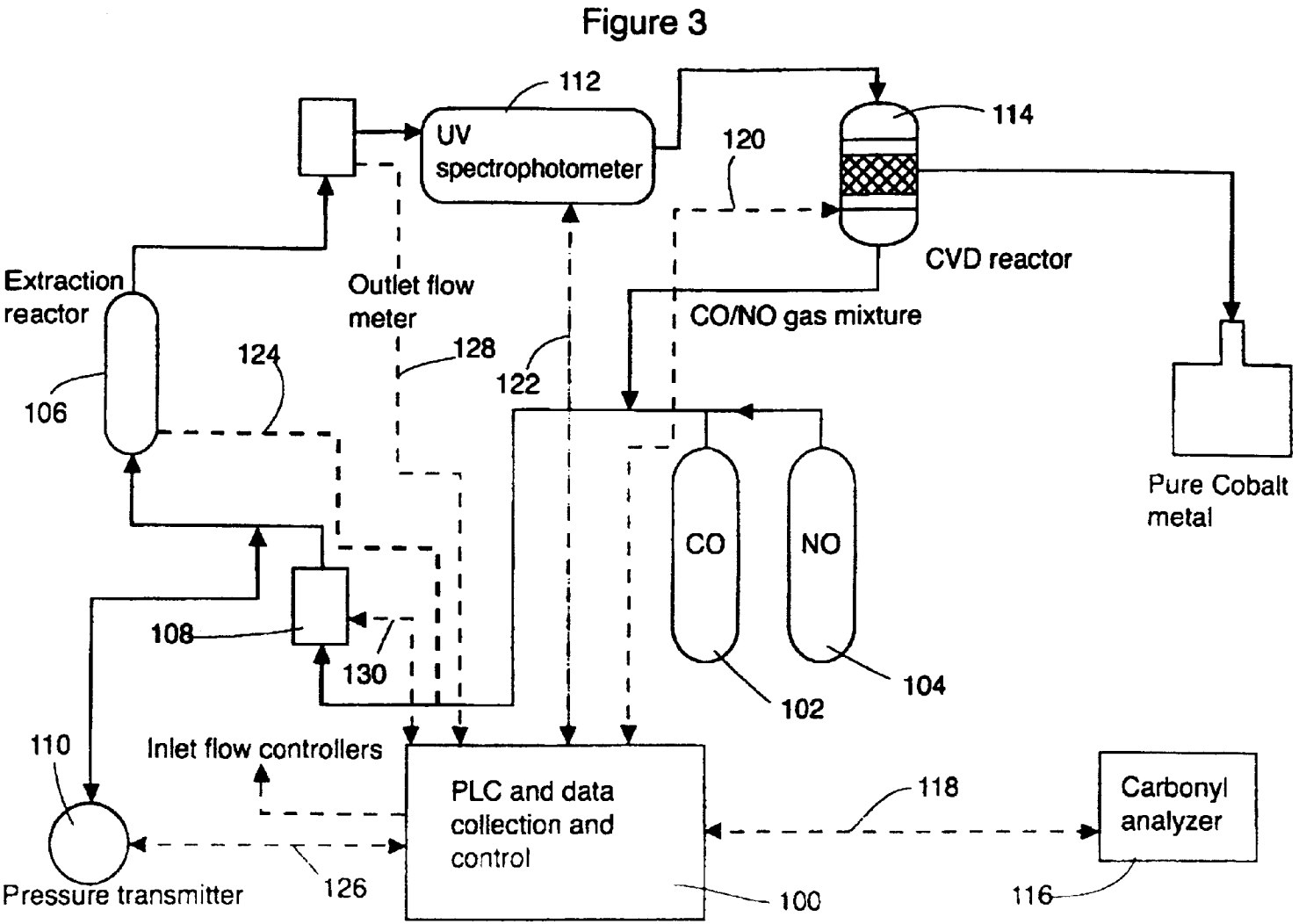
FIG. 3 is a schematic diagram of a more detailed apparatus and process according to an embodiment of the invention.

With reference now to FIG. 3, under the control of programmable logic controller 100, CO or NO gas, as the case may be, is passed from respective storage tanks 102, 104, respectively, to metal extraction chamber 106 through inlet flow controllers 108, as sensed by pressure transmitter 110. When nickel, iron and cobalt metals are to be treated with CO, only tank 102 is opened. Resultant $Ni(CO)_4$ and $Fe(CO)_5$ are removed from reactor chamber 106 and treated as hereinbefore described and measured by UV chemiluminescent spectrophotometer 112. Ni and Fe are recovered from the respective metal carbonyl, and recovered CO is recycled from chemical vapour deposition reactor 114. Ambient metal carbonyl levels are measured in chemiluminescent analyzer 116.

NO is subsequently fed into chamber 106 for the production of cobalt nitrosyl carbonyl to CVD reactor 114 and CO/NO mixture is recycled as hereinbefore described.

Lines 118, 120, 122, 124, 126, 128 and 130 are linked to PLC 100 to provide, respectively, (a) metal carbonyl concentration levels in the surrounding ambient air, (b) temperature and pressure readings, (c) metal carbonyl concentration levels in outlet gases, (d) temperature measurement and control in extraction chamber 106, (e) gaseous pressure readings within chamber 106, (f) outflow rates from outflow controller, and (g) inflow rates of CO and NO, respectively, during the operation. PLC 100 further provides control of these parameters under software program control, particularly, a safe shut-down regime, whereby continuous, closed gaseous recycle conditions are provided, subject only to batchwise treatment of impure metal addition and pure metal removal.

Figure 4:
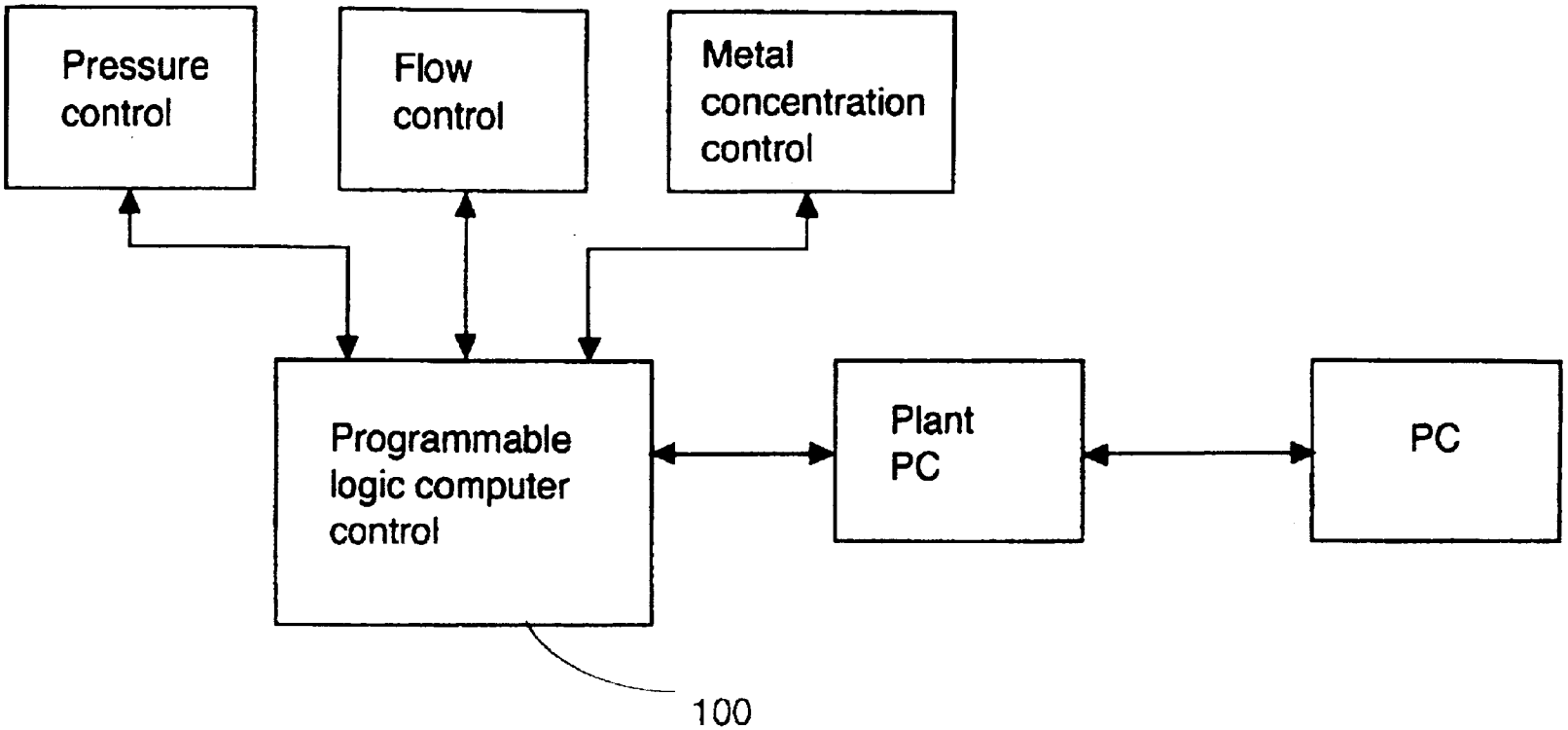
FIG. 4 is a block diagram showing the computer control links in a cobalt recovery process according to the invention.

With reference to FIG. 4, this shows PLC 100 loaded with software algorithms set, according to the parameters of the process. Suitably located temperature and pressure probes, flow meters and associated control valves are thus monitored and controlled.

EXAMPLE 1

A mixture of metal sulfides consisting of 44% W/W elemental nickel, 6% W/W elemental cobalt and 1% W/W elemental iron, together with small amounts of chromium, manganese, magnesium, aluminum and silicon oxides/sulfides was mixed with 20 Kg of $Ca(OH)_2$ per 100 Kg of sulphides mixture, and formed into slurry (52). The resulting mixture was heated to 60° C. and carbon monoxide introduced into the mixture and bubbled through slurry (54) under 3 bar pressure. The CO gas released from solution carried over nickel carbonyl, reclaimed (56) and recycled into process (54). The concentration of nickel carbonyl in outlet CO gas was constantly monitored to ensure complete removal of nickel from the slurry. After 8 hours, about 80% of nickel was removed from the slurry, and about 97% removed after 24 hours. After most of the nickel carbonyl was removed from the reactor, the resultant mixture was filtered and a NO/CO gas mixture introduced into the solution at 40° C. under 3 bar pressure (62). Released NO/CO mixture was passed through the reclaim system to remove cobalt nitrosyl carbonyl ($CoNO(CO)_3$) formed in the process, and then recycled back into the process. The concentration of $CoNO(CO)_3$ in NO/CO was constantly monitored to ensure complete removal of Co. After about 2 hours, 80% of the cobalt was removed from the reaction mixture, and about 94% after about 6 hours. The resultant $CoNO(CO)_3$ was dried and thermally decomposed (64) into the different forms of Co metal such as powder, pellets or mesh shaped (66). Released NO/CO gas mixture from the thermal decomposition of $CoNO(CO)_3$, was pressurized and recycled into the process. Typical extraction yields were 97% for Ni and 94% for Co.

EXAMPLE 2

A mixture of Ni, Fe, Co oxides in amounts Ni (85 Kg), Fe (1 kg), Co (12 Kg) and a 3 Kg mixture of other metal oxides (Cr, Mn, Cu, Zn) (14) was reduced with $CO/H_2$ mixture (12) as described in GB Patent Nos. 323,332 and 324,382. The chamber was then purged with either argon or nitrogen and the temperature of the reduced mixture of metals was lowered to 80–90° C. Carbon monoxide gas was then passed through the mixture of reduced metals, under 10–20 bar pressure to produce metal carbonyls (16). Resultant nickel carbonyl, iron carbonyl and CO mixture was passed through the chemical vapour deposition (CVD) reclaim system (20) and metal carbonyl-depleted CO recycled into vessel (16). At temperatures of less than 100° C., the cobalt carbonyl appears to remain as a coat on the surface of the cobalt metal to significantly reduce the cobalt carbonylation reaction rate. The concentration of $Fe(CO)_5$ and $Ni(CO)_4$ in the gas mixture was monitored to ensure essentially complete removal of Ni and Fe. After 12 hours about 80% Ni was removed from the mixture, and about 98% after about 24 hours. Removal of nickel carbonyl an iron carbonyl left metallic cobalt and solid cobalt carbonyl mixture (22). After the concentration of nickel and iron carbonyls in CO gas was reduced to the 100 ppm level, a mixture of NO/CO (28) was introduced into chamber (22) and the temperature maintained at 100° C. and the NO/CO containing outlet mixture was passed through CVD reclaim system 20 to produce gaseous cobalt carbonyl, which was distilled off and thermally decomposed into metal cobalt products, such as powder, pellets or mesh shapes (32). Released NO/CO gas mixture from the thermal decomposition of $CoNO(CO)_3$ was pressurized and recycled within the process. After about 6 hours, 80% of the Co was deposited from the mixture, and about 95% after about 24 hours. Typical extraction yields were about 95–96% Co of a purity of greater than 99.8% Co.

Although this disclosure has described and illustrated certain preferred embodiments of the invention, it is to be understood that the invention is not restricted to those particular embodiments. Rather, the invention includes all embodiments which are functional or mechanical equivalents of the specific embodiments and features that have been described and illustrated.

What is claimed is:

1. A process for producing purified cobalt from a mixture comprising metallic species of cobalt and metallic species of at least one of the group consisting of nickel and iron; said process comprising producing a metal carbonyl mixture of cobalt carbonyl and at least one of nickel carbonyl and iron carbonyl from said metallic species mixture;

separating said nickel carbonyl and said iron carbonyl from said cobalt carbonyl to provide a resultant nickel carbonyl- and iron carbonyl-free mixture;

treating said resultant mixture with an effective amount of a complexing gaseous mixture of nitric oxide and carbon monoxide to produce cobalt nitrosyl tricarbonyl;

decomposing said cobalt nitrosyl tricarbonyl to provide said purified cobalt and regenerated complexing gaseous mixture; and removing said regenerated complexing gaseous mixture.

2. A process as defined in claim 1 further comprising continuously self-monitoring, by measuring, controlling and adjusting process parameters selected from the group consisting of temperature, pressure, gaseous input flow rates, gaseous output flow rates and power supply under the control of computer algorithmic microprocessor means.

3. A process for producing purified cobalt from a mixture comprising metallic species of cobalt and metallic species of at least one of the group consisting of nickel and iron; said process comprising:

(i) reacting said metallic species with carbon monoxide to form a carbonyl mixture comprising cobalt carbonyl and at least one of nickel carbonyl and iron carbonyl, provided that when said metallic species comprises non-elemental metal species, said mixture is, optionally, first treated with a reducing agent to reduce said non-elemental metal species to said elemental metal;

(ii) removing said nickel carbonyl and said iron carbonyl by distillation from said carbonyl mixture to provide a nickel- and iron-depleted impure cobalt carbonyl mixture;

(iii) treating said impure cobalt carbonyl mixture with an effective amount of a complexing gaseous mixture of nitric oxide and carbon monoxide to produce cobalt nitrosyl tricarbonyl;

(iv) decomposing said cobalt nitrosyl tricarbonyl to provide said purified cobalt and regenerated complexing gaseous mixture; and (v) removing said regenerated complexing gaseous mixture.

4. A process as defined in claim 3 further comprising decomposing said nickel and/or iron carbonyl from step (ii) to provide regenerated carbon monoxide and recycling at least a part of said carbon monoxide to step (i).

5. A closed loop process as defined in claim 4 further comprising recycling said regenerated complexing gaseous mixture from step (v) to step (iii).

6. A process as defined in claim 3 further comprising recycling said regenerated complexing gaseous mixture from step (v) to step (iii).

7. A process as defined in claim 3 wherein step (i) comprises treating said non-elemental metal species with a reducing agent selected from the group consisting of carbon monoxide, hydrogen and mixtures thereof.

8. A process for producing purified cobalt from a mixture comprising metallic species of cobalt and metallic species of at least one of the group consisting of nickel and iron; said process comprising (i) treating said mixture in aqueous alkaline medium with hydrogen sulfide to effect reduction of metal species to soluble metallic species;

(ii) subsequently treating said medium with carbon monoxide to produce cobalt carbonyl in admixture with at least one of nickel carbonyl and iron carbonyl in aqueous slurry;

(iii) removing said nickel carbonyl, if any, by volatilization from said solution to provide a nickel carbonyl depleted-solution containing cobalt carbonyl;

(iv) treating said solution with an effective amount of a complexing gaseous nitric oxide and carbon monoxide mixture to produce cobalt nitrosyl tricarbonyl;

(v) isolating said cobalt nitrosyl tricarbonyl by distillation to provide purified cobalt nitrosyl tricarbonyl;

(vi) decomposing said purified cobalt nitrosyl tricarbonyl to provide said purified cobalt and regenerated complexing gaseous mixture; and (vii) removing said regenerated complexing gaseous mixture.

* * * * *